Patented Nov. 1, 1927.

1,647,145

UNITED STATES PATENT OFFICE.

JAMES P. PENNY, OF BUFFALO, NEW YORK, ASSIGNOR TO NATIONAL ANILINE & CHEMICAL CO., INC., OF NEW YORK, N. Y., A CORPORATION OF NEW YORK.

DISAZO DYE.

No Drawing.    Application filed September 26, 1924. Serial No. 740,042.

This invention relates to the manufacture and production of new disazo dyes for wool suitable for afterchroming or for dyeing on mordanted wool. In combination with metallic salts or compounds, they are also valuable for printing on cotton. The materials dyed or printed with the new dyestuffs, with or without the use of mordants, also form a part of the present invention.

The new disazo dyes of the present invention can be obtained by coupling one molecular proportion of a diazotized beta-naphthylamine disulfonic acid (as first component) with one molecular proportion of a primary amine of the benzene series having a free para position (as middle component), diazotizing the amino monazo compound thus obtained and coupling it with one molecular proportion of an ortho-hydroxycarboxylic acid of the benzene series (as end component). In carrying out the first coupling, it is often advantageous to employ the middle component in the form of its N-methyl-omega-sulfonic acid (sodium salt) derivative,

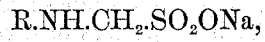

and subsequently eliminating the N-methyl-omega-sulfonic acid group before proceeding with the second diazotization and coupling with the end component.

The new dyes are salts of an acid having the following probable formula:

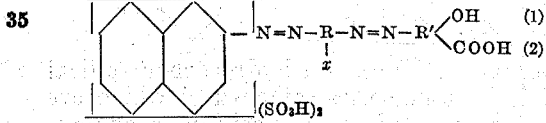

wherein R and R' each represent a hydrocarbon radical of the benzene series and $x$ represents a hydrogen atom which may be substituted by an alkoxy group such as $OCH_3$, $OC_2H_5$, etc. In the dried and pulverized state and in the shape of their sodium salts, they are yellow to orange to brown powders soluble in water giving orange to brown solutions which on the addition of caustic soda turn to a deeper shade. They are soluble in concentrated sulfuric acid giving generally bluish-red to violet solutions, and they dye wool from acid baths giving generally yellow to orange shades which are changed by subsequent chroming to red-orange to brown shades of excellent fastness to light, washing, and fulling. On wool mordanted with chromium compounds they dye similar shades. In combination with a chrome mordant, they print on cotton and produce orange to brown shades.

The following example will further illustrate the invention, but it is understood that the invention is not limited thereto. The parts are by weight.

Example: 34.7 parts of the sodium salt of 2-naphthylamine-6.8-disulfonic acid is disazotized in the known manner with 6.9 parts of sodium nitrite, 30 parts of 20° Bé. hydrochloric acid and 800 parts water at a temperature of about 0° to 5° C. When diazotization is complete, add crystallized sodium acetate to the well-stirred solution until the solution is no longer acid toward Congo red test paper but is still acid toward litmus test paper.

The diazo solution thus obtained is then slowly added to a well-stirred solution of 23 parts of the sodium salt of the N-methyl-omega-sulfonic acid derivative of aniline (prepared in the known manner by condensing aniline with an equimolecular proportion of formaldehyde-sodium bisulfite compound in aqueous solution) in 1000 parts water containing 15 parts of sodium acetate. After stirring the mixture for a short time, 10 parts of sodium carbonate in aqueous solution is added. When the coupling is finished, 25 parts of caustic soda are added, and the solution heated to about 90° C. until no formaldehyde is further evolved. 100 parts of common salt are then added, the agitated solution allowed to cool to room temperature, and the separated amino-monazo compound filtered off. If desired, it may be resludged in a saturated salt solution and again filtered off. 45 parts of the amino-monazo compound thus produced are dissolved in 1000 parts of water and diazotized by means of 6.9 parts sodium nitrite and 30 parts of 20° Bé. hydrochloric acid, and the diazo solution added to a solution of 15.2 parts salicylic acid in 300 parts water at about 0° to 3° C. containing 30 parts of sodium carbonate and 10 parts caustic soda. The coupling is complete when a test shows no diazo compound to be present. The dyestuff is salted out by the addition of common salt, filtered off, washed, pressed and dried. The dyestuff has the following probable formula:

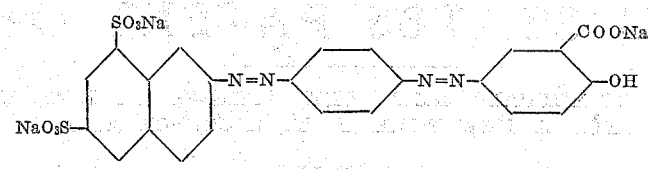

and in the dried state forms a light brown powder soluble in water giving an orange solution, and in concentrated sulfuric acid giving a violet solution. It dyes wool yellow tints which become orange to brown when after-chromed or when dye on wool mordanted with chromium compounds. In chrome-printing on cotton it produces orange to brown shades.

Instead of 2-naphthylamine 6-8-disulfonic acid, 2-naphthylamine-5.7-disulfonic acid, or 2-naphthylamine-3.6-disulfonic acid, or other beta-naphthylamine disulfonic acids may be used and dyestuffs having similar properties will be produced. Also, in place of aniline, o- and m-toluidine, p-xylidine, o- and m-anisidine, 4-methyl-2-amino-1-methoxybenzene, and other primary amines of the benzene series having a free para position can be used, and instead of salicylic acid, o-cresotinic and other homologues of salicylic acid can be used. In most cases the diazotized 2-naphthylamine disulfonic acids can be directly combined with the primary amines without the previous preparation of the N-methyl-omega-sulfonic acid (i. e., the formaldehyde bisulfite compound) derivative of the primary amine. In some cases, however, it is advantageous to proceed by way of the formaldehyde-disulfite compound, for example, when coupling into aniline, o-toluidine or o-anisidine.

I claim:

1. Process of producing disazo dyestuffs which comprises coupling one molecular proportion of a diazotized beta-naphthylamine disulfonic acid with one molecular proportion of a primary amine of the benzene series having a free para position, diazotizing the amino-azo compound thus obtained and coupling it with one molecular proportion of an ortho-hydroxycarboxylic acid of the benzene series.

2. Process of producing a disazo dyestuff which comprises coupling one molecular proportion of diazotized 2-naphthylamine-6.8-disulfonic acid with one molecular proportion of the N-methyl-omega-sulfonic acid derivative of aniline, subsequently eliminating the N-methyl-omega-sulfonic acid group and diazotizing the amino azo compound thus obtained and coupling it with one molecular proportion of salicylic acid.

3. As new products, the disazo dyestuffs being salts of an acid having the following probable formula:

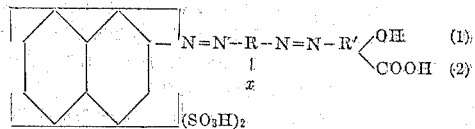

wherein R and R' each represent a hydrocarbon radical of the benzene series, the azo bridges being attached in para-position in the radical R, and $x$ represents a hydrogen atom which may be substituted by an alkoxy group, such as $OCH_3$, $OC_2H_5$, etc.; said dyestuffs in the dry and pulverized state in the shape of their sodium salts being yellow to orange to brown powders soluble in water giving orange to brown solutions, and soluble in sulfuric acid giving generally bluish-red to violet solutions; dyeing wool from an acid bath yellow to orange shades which upon after-chroming upon the fiber produce orange to brown shades; and chrome printed on cotton produces orange to brown shades.

4. As new products, the disazo dyestuffs which in the free state correspond with the following general formula:

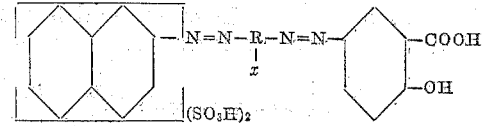

wherein R represents a hydrocarbon radical of the benzene series attached to which are two azo groups in para position to one another, and $x$ represents a hydrogen atom or an alkoxy group; said dyestuffs in the form of their sodium salts being soluble in water.

5. As new products, the disazo dyestuffs being alkali metal salts of an acid having the following probable formula:

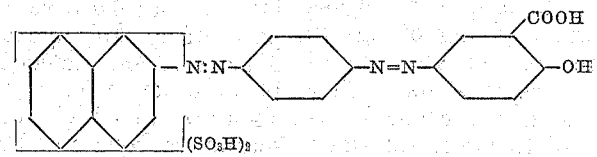

said dyestuffs in the dried and pulverized state in the shape of their sodium salts being yellowish-brown to reddish-brown powders soluble in water giving orange to reddish orange solutions, and soluble in concentrated sulfuric acid giving violet to reddish-violet solutions; dyeing wool yellow to reddish-yellow shades which on being after-chromed change to reddish-brown shades; and chrome printed on cotton produce orange to reddish-brown shades.

6. As a new product, a disazo dye being an alkali metal salt of the acid having the following probable formula:

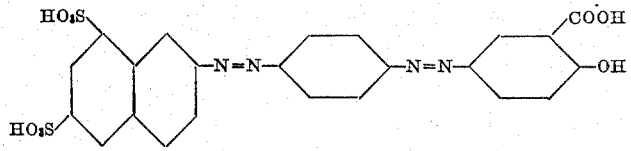

being in the dried and pulverized state in the shape of its sodium salt a light brown powder soluble in water with an orange color which on the addition of caustic soda changes to a red, and soluble in concentrated sulfuric acid with a violet color; dyeing wool yellow tints which on after-chroming change to a reddish-brown, and chrome-printed on cotton produces orange to brown shades.

7. Material dyed with a disazo dyestuff of claim 3, said dyestuff being mordanted with a chromium compound.

8. Material dyed with a disazo dyestuff of claim 4, said dyestuff being mordanted with a chromium compound.

9. Material dyed with a disazo dyestuff of claim 5, said dyestuff being mordanted with a chromium compound.

10. Material dyed with the disazo dyestuff of claim 6.

11. Cotton chrome-printed with a disazo dyestuff of claim 3.

12. Cotton chrome-printed with a disazo dyestuff of claim 4.

13. Cotton chrome-printed with a disazo dyestuff of claim 5.

14. Material chrome-printed with the disazo dyestuff of claim 6.

In testimony whereof I affix my signature.

JAMES P. PENNY.